United States Patent
Tan et al.

(10) Patent No.: US 9,564,973 B2
(45) Date of Patent: Feb. 7, 2017

(54) METHOD AND APPARATUS FOR TRANSMITTING AND RECEIVING INTERFACE SIGNALS OF DISTRIBUTED BASE STATION

(71) Applicant: Huawei Technologies Co., Ltd., Shenzhen (CN)

(72) Inventors: Jingxin Tan, Shenzhen (CN); Xin Xiao, Shenzhen (CN); Zhiyong Huang, Shenzhen (CN); Chaoyang Li, Shenzhen (CN); Binghua Zhang, Wuhan (CN); Wei Du, Shenzhen (CN); Hanguo Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/059,040

(22) Filed: Mar. 2, 2016

(65) Prior Publication Data
US 2016/0197677 A1    Jul. 7, 2016

Related U.S. Application Data

(63) Continuation of application No. 13/747,127, filed on Jan. 22, 2013, now Pat. No. 9,300,403, which is a
(Continued)

(51) Int. Cl.
*H04W 4/00* (2009.01)
*H04B 10/27* (2013.01)
(Continued)

(52) U.S. Cl.
CPC ........ *H04B 10/27* (2013.01); *H04B 10/25759* (2013.01); *H04B 10/50* (2013.01);
(Continued)

(58) Field of Classification Search
None
See application file for complete search history.

(56) References Cited

U.S. PATENT DOCUMENTS 7,460,513 B2 * 12/2008 Osterling .............. H04W 92/12
370/208
7,817,603 B2   10/2010 Liu
(Continued)

FOREIGN PATENT DOCUMENTS

| CN | 101232652 A | 7/2008 |
| CN | 101350662 A | 1/2009 |

(Continued)

OTHER PUBLICATIONS

Leavey, "Enabling Distributed Base Station Architectures with CPRI; White Paper," XP007920617, Feb. 2006, PMC-2051877, Issue 1, Sierra PMC, Sunnyvale, California.
(Continued)

*Primary Examiner* — Phirin Sam
(74) *Attorney, Agent, or Firm* — Leydig, Voit & Mayer, Ltd.

(57) ABSTRACT

The disclosures provide a method and apparatus for transmitting and receiving interface signals of a distributed base station. At least one channel of Common Public Radio Interface (CPRI) signals of a distributed base station are encapsulated into optical transport unit x (OTUx) signals in a frame structure of OTUx by adopting Generic Mapping Procedure (GMP) mapping scheme, wherein the x represents a transmission capacity and wherein the OTUx is adopted for providing a bandwidth required by the at least one channel of CPRI signals, and then the OTUx signals that bear the at least one channel of CPRI signals are sent.

13 Claims, 10 Drawing Sheets

Related U.S. Application Data continuation of application No. 13/287,830, filed on Nov. 2, 2011, now Pat. No. 8,406,178, which is a continuation of application No. PCT/CN2009/072937, filed on Jul. 27, 2009.

(51) Int. Cl.
  *H04B 10/2575* (2013.01)
  *H04J 3/16* (2006.01)
  *H04J 14/02* (2006.01)
  *H04J 14/00* (2006.01)
  *H04B 10/50* (2013.01)

(52) U.S. Cl.
  CPC .......... *H04J 3/1652* (2013.01); *H04J 3/1664* (2013.01); *H04J 14/00* (2013.01); *H04J 14/028* (2013.01); *H04J 14/0282* (2013.01); *H04J 14/0286* (2013.01)

(56) References Cited

U.S. PATENT DOCUMENTS

| | | | |
|---|---|---|---|
| 7,826,741 B2 | 11/2010 | Katagiri | |
| 7,936,788 B2 | 5/2011 | Zhang | |
| 7,937,110 B2 | 5/2011 | Wu et al. | |
| 7,940,667 B1 | 5/2011 | Coady et al. | |
| 7,948,975 B2 | 5/2011 | Markus et al. | |
| 8,135,285 B2 | 3/2012 | Kisaka et al. | |
| 8,666,242 B2 | 3/2014 | Bianchi et al. | |
| 2003/0161634 A1 | 8/2003 | Costabile et al. | |
| 2004/0057543 A1 | 3/2004 | Huijgen et al. | |
| 2004/0076195 A1 | 4/2004 | Bentz et al. | |
| 2004/0096222 A1 | 5/2004 | Cagenius | |
| 2005/0036520 A1 | 2/2005 | Zeng et al. | |
| 2005/0105552 A1 | 5/2005 | Osterling | |
| 2005/0117905 A1 | 6/2005 | Lee et al. | |
| 2006/0083512 A1 | 4/2006 | Wake | |
| 2006/0274865 A1* | 12/2006 | Arunachalam | H04L 27/2647 375/345 |
| 2007/0019679 A1 | 1/2007 | Scheck et al. | |
| 2007/0104485 A1 | 5/2007 | Zhang | |
| 2007/0116046 A1* | 5/2007 | Liu | H04J 3/1617 370/466 |
| 2007/0160012 A1 | 7/2007 | Liu | |
| 2007/0177552 A1 | 8/2007 | Wu et al. | |
| 2007/0211750 A1 | 9/2007 | Li et al. | |
| 2007/0242689 A1 | 10/2007 | Zavadsky et al. | |
| 2008/0080860 A1 | 4/2008 | Katagiri | |
| 2008/0124079 A1* | 5/2008 | Zou | H04J 3/1658 398/58 |
| 2008/0181171 A1 | 7/2008 | Koziy et al. | |
| 2008/0181608 A1 | 7/2008 | Parker et al. | |
| 2008/0199183 A1 | 8/2008 | Liu et al. | |
| 2009/0103922 A1 | 4/2009 | Lee et al. | |
| 2009/0208208 A1* | 8/2009 | Chen | H04J 3/1658 398/45 |
| 2009/0213873 A1* | 8/2009 | Frlan | H04J 3/1658 370/464 |
| 2009/0252108 A1* | 10/2009 | Watanabe | H04W 28/065 370/329 |
| 2009/0291681 A1* | 11/2009 | Hara | H04W 88/08 455/422.1 |
| 2010/0014422 A1 | 1/2010 | Lee et al. | |
| 2010/0087227 A1 | 4/2010 | Francos et al. | |
| 2010/0239256 A1 | 9/2010 | Zheng | |
| 2010/0296816 A1 | 11/2010 | Larsen | |
| 2011/0135013 A1 | 6/2011 | Wegener | |
| 2011/0286540 A1* | 11/2011 | Jiang | H04W 88/10 375/259 |
| 2011/0286744 A1 | 11/2011 | Shin et al. | |

FOREIGN PATENT DOCUMENTS

| | | | |
|---|---|---|---|
| EP | 2226954 A1 | 9/2010 | |
| RU | 2289207 C1 | 12/2006 | |
| WO | WO 2005048624 A1 | 5/2005 | |

OTHER PUBLICATIONS

"IEEE Standard 802.3—IEEE Standard for Information Technology; Telecommunications and Information Exchange Between Systems; Local and Metropolitan Area Networks; Specific Requirements; Part 3: Carrier Sense Multiple Access with Collision Detection (CSMA/CD) Access Method and Physical Layer Specifications," Mar. 2002, IEEE, New York, New York.

"G.709/Y.1331—Series G: Transmission Systems and Media, Digital Systems and Networks, Digital Terminal Equipments—General; Series Y: Global Information Infrastructure, Internet Protocol Aspects and Next Generation Networks, Internet Protocol Aspects—Transport," ITU-T G-Series Recommendations, Mar. 2003, International Telecommunication Union, Geneva, Switzerland.

"G.709/Y.1331; Amendment 2—Series G: Transmission Systems and Media, Digital Systems and Networks, Digital Terminal Equipments—General; Series Y: Global Information Infrastructure, Internet Protocol Aspects and Next Generation Networks, Internet Protocol Aspects—Transport," ITU-T G-Series Recommendations, Nov. 2007, International Telecommunication Union, Geneva, Switzerland.

"G.709/Y.1331; Amendment 3—Series G: Transmission Systems and Media, Digital Systems and Networks, Digital Terminal Equipments—General; Series Y: Global Information Infrastructure, Internet Protocol Aspects and Next Generation Networks, Internet Protocol Aspects—Transport," ITU-T G-Series Recommendations, Apr. 2009, International Telecommunication Union, Geneva, Switzerland.

"G.7041/Y.1303—Series G: Transmission Systems and Media, Digital Systems and Networks, Digital Terminal Equipments—General; Series Y: Global Information Infrastructure and Internet Protocol Aspects, Internet Protocol Aspects—Transport," G-Series Recommendations, Dec. 2001, International Telecommunication Union, Geneva, Switzerland.

"G.7041/Y.1303—Series G: Transmission Systems and Media, Digital Systems and Networks, Digital Terminal Equipments—General; Series Y: Global Information Infrastructure and Internet Protocol Aspects, Internet Protocol Aspects—Transport," ITU-T G-Series Recommendations, Dec. 2003, International Telecommunication Union, Geneva, Switzerland.

"G.7041/Y.1303—Series G: Transmission Systems and Media, Digital Systems and Networks, Digital Terminal Equipments—General; Series Y: Global Information Infrastructure and Internet Protocol Aspects, Internet Protocol Aspects—Transport," ITU-T G-Series Recommendations, Oct. 2008, International Telecommunication Union, Geneva, Switzerland.

Notice of Allowance in corresponding U.S. Appl. No. 13/287,830 (Oct. 26, 2012).

1st Office Action in corresponding U.S. Appl. No. 13/287,830 (Feb. 2, 2012).

2nd Office Action in corresponding U.S. Appl. No. 13/287,830 (Jul. 11, 2012).

\* cited by examiner

FIG. 7

| | 1 | 2 | 3 | 4 |
|---|---|---|---|---|
| 3824 | | S | | S |
| | | D | | D |
| | | D | | D |
| | S | D | S | D |
| | D | | D | |
| | D | | D | |
| | D | | D | |
| | | S | | S |
| 1921 | | D | | D |
| 1920 | S | D | S | D |
| | | D | | D |
| 1905 | D | | D | |
| 1904 | D | | D | |
| | D | | D | |
| | D | S | D | S |
| | | S | | S |
| | | D | | D |
| | | D | | D |
| | D | D | D | D |
| | D | | D | |
| 17 | D | | D | |
| 16 | Cn | Cn | Cn | RES |
| 15 | RES | RES | RES | PSI |

METHOD AND APPARATUS FOR TRANSMITTING AND RECEIVING INTERFACE SIGNALS OF DISTRIBUTED BASE STATION

CROSS-REFERENCE TO RELATED APPLICATIONS

This application is a continuation of U.S. patent application Ser. No. 13/747,127, filed on Jan. 22, 2013, which is a continuation of U.S. patent application Ser. No. 13/287,830, filed on Nov. 2, 2011, now U.S. Pat. No. 8,406,178. The U.S. patent application Ser. No. 13/287,830 is a continuation of International Patent Application No. PCT/CN2009/072937, filed on Jul. 27, 2009. The afore-mentioned patent applications are hereby incorporated by reference in their entireties.

FIELD OF THE INVENTION

The present invention relates to the field of communications technologies, and in particular, to a method and apparatus for transmitting and receiving interface signals of a distributed base station.

BACKGROUND

The 2G/3G radio network based access system includes a core network (CN), a radio access network (such as a Universal Terrestrial Radio Access Network (UTRAN)), and user equipment (UE), where the radio access network includes a radio network controller (RNC) and a radio base station (or referred to as Node B), and a distributed base station is an important form of the radio base station. As shown in FIG. 1, a distributed base station includes a base band unit (BBU) and a remote radio unit (RRU). The interface of the radio distributed base station is a bus interface between the BBU and the RRU, where the bus interface is generally an optical interface or may be an electrical interface. The BBU is a small-sized box-type device; the RRU is an outdoor remote radio device, which is mounted directly on the metal mast or on the wall near the antenna. The interface between the BBU and the RRU is connected via one or several specific signal links, and includes any of the three types: a Common Public Radio Interface (CPRI), IR interface, and Open Base Station Architecture Initiative (OBSAI) interface, with the mainstream rate more than 1228.8M. The interface of the distributed base station in Time Division-Synchronous Code Division Multiple Access (TD-SCDMA) mode is the IR interface, for which each link is at a high-speed serial digital transmission rate. Currently, the commercial mainstream rate is 2457.6 Mb/s, which may, in the future, be 3.0720 Gb/s or higher. Transmission on the links for interface signals of radio distributed base station between the BBU and the RRU is realized by consuming optical fiber resources. The number of the channels of interface signals of the distributed base station which can be borne by optical fiber influences the requirements on both optical fiber resources in the existing network during networking of the distributed base station, and the costs of transmitting the interface signals of the distributed base station. Transmission technology can impact the efficiency of operating and maintaining networks.

In the prior art, the Wavelength Division Multiplexing (WDM) technology is applied for signal transmission between the BBU and the RRU. That is, as shown in FIG. 2, a WDM wavelength is adopted for each channel of interface signals of the distributed base station in the radio base band pool of the BBU. The four channels of signals in FIG. 2 respectively adopt $\lambda 1$, $\lambda 2$, $\lambda 3$, and $\lambda 4$, which are transmitted after being processed by an optical wavelength splitting/merging module. At the remote radio unit of the receiving end, received optical signals are firstly processed by the optical wavelength splitting/merging module, and then the separated optical signals are transmitted to the corresponding remote radio module. Due to attenuation of the optical signals transmitted in the optical fiber, for the optical signals that need to pass long transmission distance, an optical amplifier can be added in the optical path to amplify the optical signals during transmission. In this way, longer transmission distance can be realized, and system monitoring can be performed by setting a system monitoring module in the system.

During the implementation of the present invention, the inventor finds that: In the prior art, each channel of the interface signals of the distributed base station needs to occupy an optical wavelength, which leads to low transmission efficiency during transmission between the BBU and the RRU.

SUMMARY

The embodiments of the present invention provide a signal transmission processing method and a signal transmission processing apparatus and a distributed base station to improve the efficiency of signal transmission.

In order to achieve the above objectives, a signal transmission processing method is provided in the present invention, including:
  obtaining at least one channel of interface signals of a distributed base station;
  performing optical transport network (OTN) electrical layer multiplexing for the obtained at least one channel of interface signals of the distributed base station; and
  performing electro-optic conversion for the signals obtained through OTN electrical layer multiplexing to generate a channel of optical signals and transmitting the signals.

A distributed-base-station-interface-signal transmission processing apparatus is provided in the present invention, including:
  an obtaining module, configured to obtain at least one channel of interface signals of a distributed base station;
  a multiplexing module, configured to perform OTN electrical layer multiplexing for the obtained at least one channel of interface signals of the distributed base station; and
  a first sending module, configured to perform electro-optic conversion for the signals obtained through OTN electrical layer multiplexing to generate a channel of optical signals and transmit the optical signals.

A distributed base station is further provided in the embodiments of the present invention, including: a BBU, an RRU, and an OTN processing module configured to accomplish a communication connection between the BBU and the RRU. The OTN processing module is configured to perform OTN electrical layer multiplexing for the interface signals of the distributed base station that are transmitted between the BBU and the RRU and transmit the signals.

By using the signal transmission processing method and the signal transmission processing apparatus and the distributed base station provided in embodiments of the present invention, OTN electrical layer multiplexing is performed on at least one channel of interface signals of the distributed base station, and electro-optic conversion is performed for the signals obtained through OTN electrical layer multiplexing to generate a channel of optical signals for transmission. Therefore, multiple channels of interface signals of the distributed base station are multiplexed into one channel of optical signals, and the optical signals are transmitted between the BBU and the RRU of the distributed base station, thereby improving the efficiency of signal transmission.

BRIEF DESCRIPTION OF THE DRAWINGS

FIG. 7 is a schematic diagram of mapping interface signals to ODUk according to an embodiment of the present invention;

DETAILED DESCRIPTION OF THE EMBODIMENTS

The technical solutions of the present invention are further elaborated in detail below with reference to accompanying drawings and embodiments.

Figure 1:
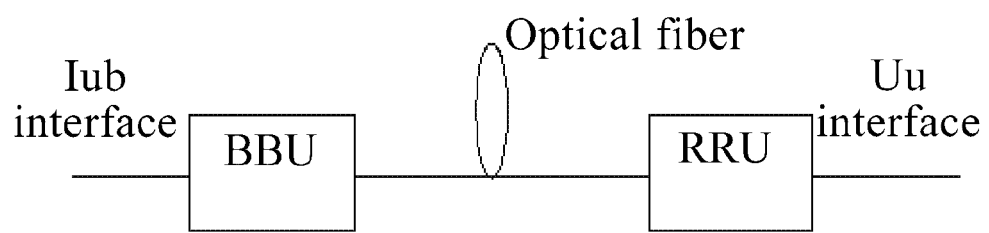
FIG. 1 is a structure diagram of a distributed base station in the prior art.
Figure 2A:
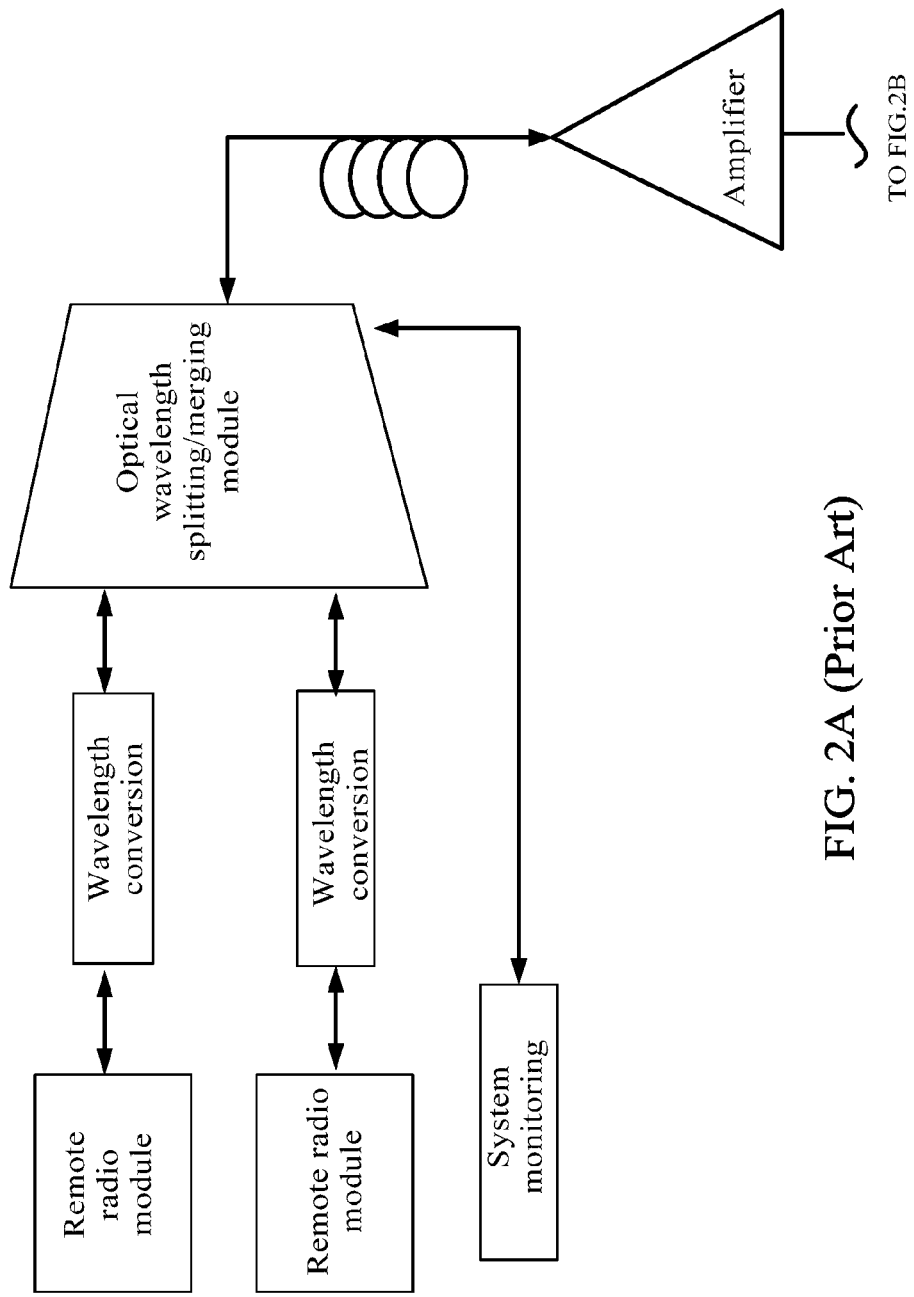
FIG. 2A is a schematic diagram of transmitting interface signals of a distributed base station in the prior art.
Figure 2B:
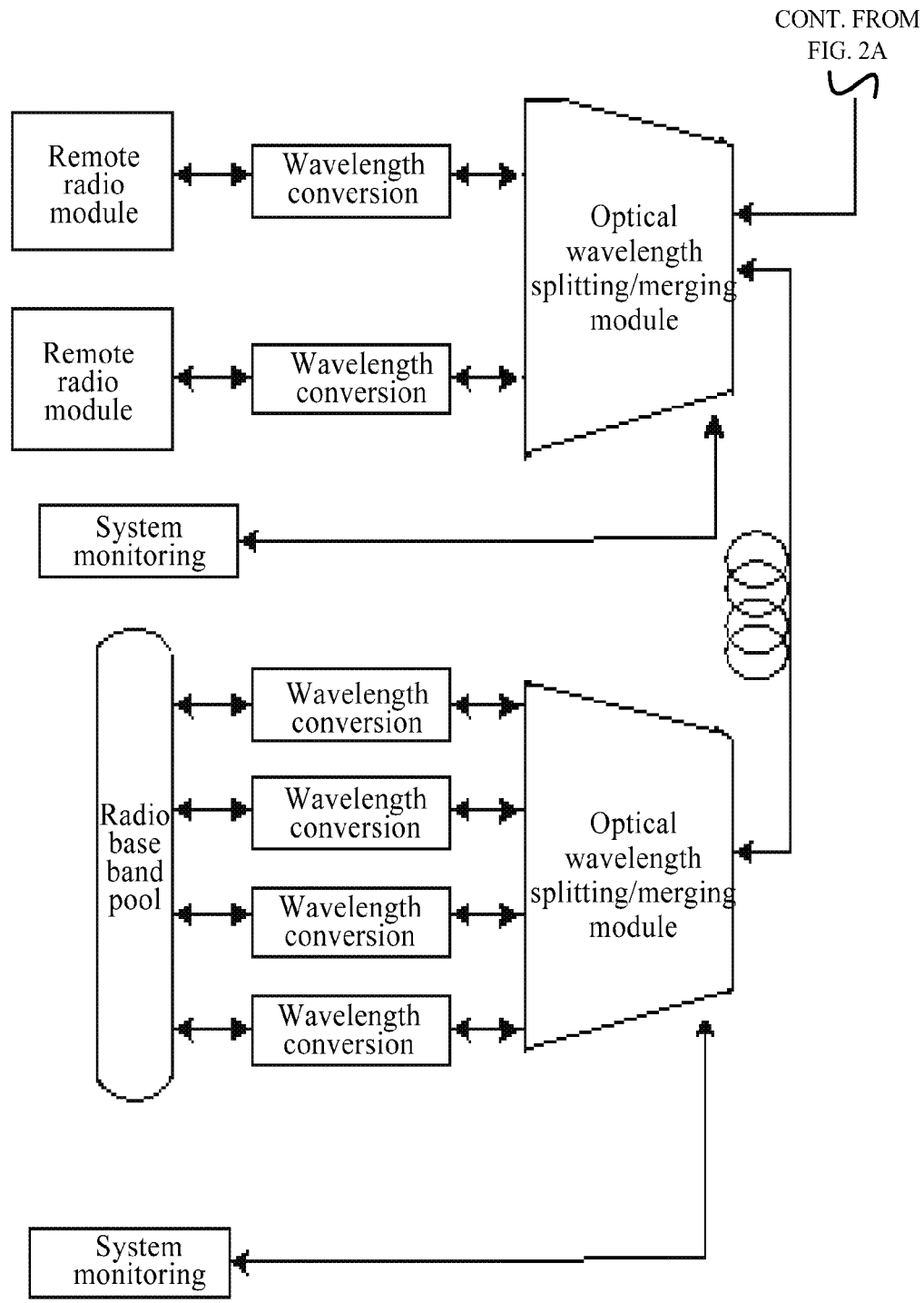
FIG. 2B is a schematic diagram of transmitting interface signals of a distributed base station in the prior art.
Figure 3:
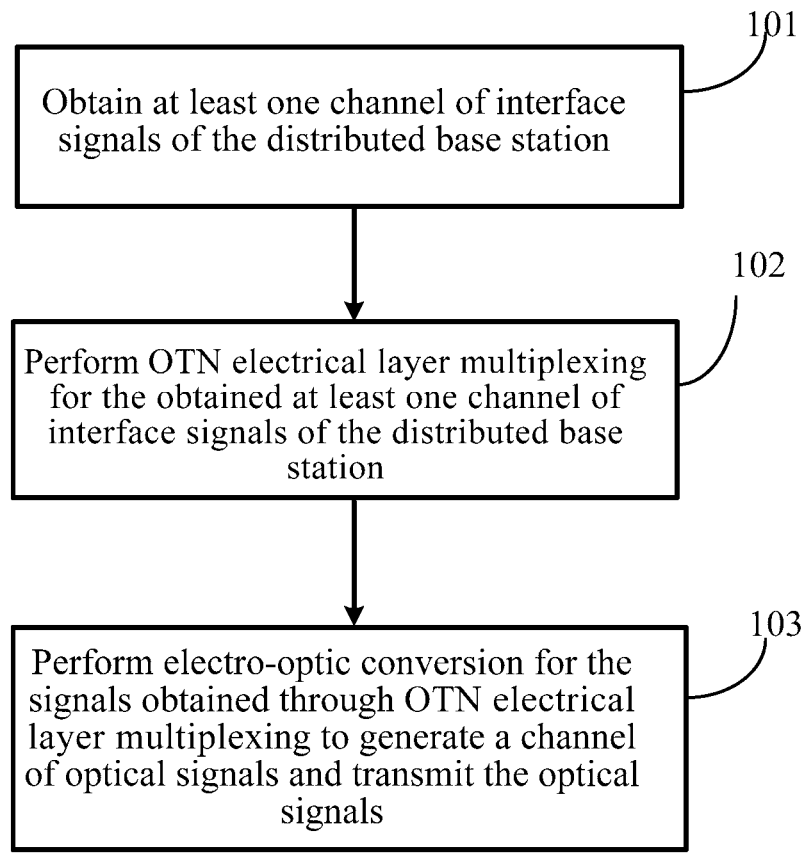
FIG. 3 is a flowchart of a signal transmission processing method according to an embodiment of the present invention.

The embodiments of the present invention provide a signal transmission processing method. FIG. 3 is a flowchart of a signal transmission processing method according to an embodiment of the present invention, including the following steps.

Step 101: Obtain at least one channel of interface signals of a distributed base station.

Step 102: Perform OTN electrical layer multiplexing for the obtained at least one channel of interface signals of the distributed base station.

Step 103: Perform electro-optic conversion for the signals obtained through OTN electrical layer multiplexing to generate one channel of optical signals and transmit the optical signals.

By using the signal transmission processing method according to the embodiment of the present invention, OTN electrical layer multiplexing is performed on at least one channel of interface signals of the distributed base station, and electro-optic conversion is performed for the signals obtained through OTN electrical layer multiplexing to generate a channel of optical signals for transmission. Therefore, multiple channels of interface signals of the distributed base station are multiplexed into one channel of optical signals, and the optical signals are transmitted between the BBU and the RRU of the distributed base station, thereby improving the efficiency of signal transmission.

The signal transmission processing method provided in the embodiment of the invention can be applied in downlink data transmission, namely, in the process of transmitting the signals from the BBU to the RRU; or can be applied in uplink data transmission, namely, in the process of transmitting the signals from the RRU to the BBU.

The interface signals of the distributed base station can be OBSAI interface signals, CPRI interface signals, or IR interface signals, where: the IR interface is an interface of the distributed base station in the TD-SCDMA mode. The above interface signals as a whole are directly encapsulated into OTN signal frames, and it is not required to perform de-encapsulating for the interface signals. The transmission mode is a transparent transmission mode, which can reduce complexity of processing signal and reduce costs. In the embodiments of the present invention, the OTN that is provided with higher transport bandwidth is adopted to transmit data, thereby providing higher data transmission rate.

In downlink signal transmission, the obtaining at least one channel of interface signals of the distributed base station may be specifically: obtaining at least one channel of interface signals of the distributed base station that are sent by at least one BBU.

In uplink signal transmission, the obtaining at least one channel of interface signals of the distributed base station may be specifically: obtaining at least one channel of interface signals of the distributed base station that are sent by at least one RRU.

For the process of the uplink signal transmission and the process of the downlink signal transmission, the processes may be the same. Specifically, the performing OTN electrical layer multiplexing for the obtained at least one channel of interface signals of the distributed base station may be: encapsulating the interface signals of the distributed base station into each OTN signal frame according to a rate of the received at least one channel of interface signals of the distributed base station; the performing electro-optic conversion for the signals obtained through OTN electrical layer multiplexing to generate one channel of optical signals and transmitting the optical signals may be: performing electro-optic conversion for the OTN signal frames to generate one channel of optical signals and transmitting the optical signals to an opposite end, particularly, transmitting through an OTN or a directly-attached fiber. When the directly-attached fiber is used, in the signal transmission processing method, the OTN device is only used to process signals to generate the OTN signal frames, and directly-attached fiber is used to transmit OTN signal frames.

In the downlink signal transmission, if the opposite end is an RRU, the signal transmission processing method may further include the following steps: performing electro-optic conversion for received optical signals and performing frame processing to obtain interface signals of the distributed base station in each OTN signal frame; and transmitting the interface signals of the distributed base station to a corresponding RRU through an optical interface or electric interface.

In uplink service data transmission, if the opposite end is a BBU, the signal transmission processing method may further include the following steps: performing electro-optic conversion for the received optical signals and performing frame processing to obtain interface signals of the distributed base station in each OTN signal frame; and transmitting the interface signals of the distributed base station to a corresponding BBU through an optical interface or electric interface.

Figure 4:
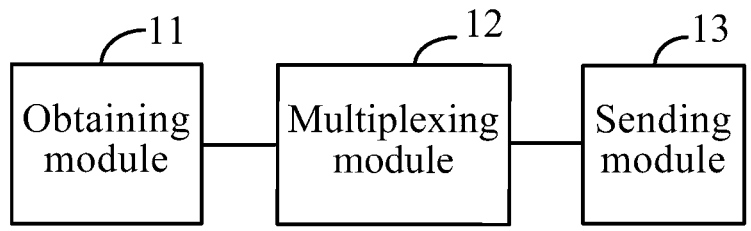
FIG. 4 is a structure diagram of a signal transmission processing apparatus according to an embodiment of the present invention.

A distributed-base-station-interface-signal transmission processing apparatus is provided in the embodiments of the present invention. FIG. 4 is a structure diagram of a signal transmission processing apparatus according to an embodiment of the present invention. As shown in FIG. 4, the apparatus includes an obtaining module 11, a multiplexing module 12, and a sending module 13, where: the obtaining module 11 is configured to obtain at least one channel of interface signals of a distributed base station, and the obtaining module in the embodiment of the present invention may be equivalent to an interface module for the interface signals of the distributed base station; the multiplexing module 12 is configured to perform OTN electrical layer multiplexing for the obtained at least one channel of interface signals of the distributed base station; and the sending module 13 is configured to perform electro-optic conversion for the signals obtained through OTN electrical layer multiplexing to generate one channel of optical signals and transmit the optical signals.

By employing the distributed-base-station-interface-signal transmission processing apparatus according to the embodiment of the present invention, OTN electrical layer multiplexing is performed for at least one channel of interface signals of the distributed base station, and electro-optic conversion is performed for the signals obtained through OTN electrical layer multiplexing to generate one channel of optical signals for transmission. Therefore, multiple channels of interface signals of the distributed base station can be multiplexed into one channel of optical signals and then transmitted between the BBU and the RRU of the distributed base station, thereby increasing efficiency of signal transmission.

The signal transmission processing apparatus according to the above embodiments of the present invention can be set at the BBU side or at the RRU side. If the apparatus is set at the BBU side, the above obtaining module includes a first obtaining unit or a second obtaining unit, where the first obtaining unit is configured to obtain at least one channel of interface signals of the distributed base station that is sent by at least one BBU. If the apparatus is set at the RRU side, the above obtaining module includes a second obtaining unit, where the second obtaining unit is configured to obtain at least one channel of interface signals of the distributed base station that are sent by at least one RRU.

Moreover, with regard to an signal transmission processing apparatus set at either of the BBU side and the RRU side, the multiplexing module therein may include a first processing unit, configured to encapsulate the interface signals of the distributed base station into respective OTN signal frames according to a rate of the received at least one channel of interface signals of the distributed base station.

The signal transmission processing apparatus, set at either of the BBU side and the RRU side, can receive the optical signals sent by the signal transmission processing apparatus at the opposite end. Therefore, a first signal processing module and a second sending module may be set, where: the first signal processing module is configured to perform optic-electro conversion for the received optical signals and perform frame processing to obtain the interface signals of the distributed base station in respective OTN signal frames; the second sending module is configured to send the interface signals of the distributed base station to a corresponding RRU or BBU through an optical interface or an electrical interface.

A distributed base station is further provided in the embodiments of the present invention. The distributed base station includes a BBU, an RRU, and an OTN processing module configured to accomplish a communication connection between the BBU and the RRU. The OTN processing module is configured to perform OTN electrical layer multiplexing for the interface signals of the distributed base station that are transmitted between the BBU and the RRU and then transmit the signals multiplexed.

A distributed base station is provided in the embodiments of the present invention. The BBU or RRU or both of the BBU and the RRU may include the above distributed-base-station-interface-signal transmission processing apparatus. The apparatus performs OTN electrical layer multiplexing for at least one channel of interface signals of the distributed base station, and performs electro-optic conversion for the signals obtained through OTN electrical layer multiplexing to generate one channel of optical signals and transmit the signals, thereby realizing to multiplex multiple channels of interface signals of the distributed base station into one channel of optical signals and transmit the signals between the BBU and the RRU of the distributed base station so as to increase the efficiency of signal transmission.

In the downlink service data transmission, the OTN processing module may further include a first OTN processing unit, a second OTN processing unit, and an OTN. The first OTN processing unit is configured to receive at least one channel of interface signals of the distributed base station that are sent by the BBU, and encapsulate the interface signals of the distributed base station into OTN signal frames according to a rate of the interface signals of the distributed base station and transmit the signals multiplexed. The second OTN processing unit is configured to receive the signals sent by the first OTN processing unit through the OTN, perform optic-electro conversion and perform frame processing to obtain the interface signals of the distributed base station in each OTN signal frame, and send the interface signals of the distributed base station to a corresponding RRU through an optical interface or an electrical interface. The OTN is configured to send the OTN signal frames, which are generated through encapsulation by the first OTN processing unit, to the second OTN processing unit.

In transmission of the uplink service data, the second OTN processing unit is further configured to receive at least one channel of interface signals of the distributed base station that are sent by the RRU, and encapsulate the interface signals of the distributed base station into the OTN signal frames according to a rate of the interface signals of the distributed base station and transmit the signals encapsulated; the first OTN processing unit is further configured to receive the signals sent by the second OTN processing unit through the OTN, perform optic-electro conversion and perform frame processing to obtain the interface signals of the distributed base station in each OTN signal frame, and send the interface signals of the distributed base station to a corresponding BBU through an optical interface or an electrical interface; and the OTN is further configured to send the OTN signal frames, which are generated through encapsulation performed by the second OTN processing unit, to the first OTN processing unit.

Figure 5A:
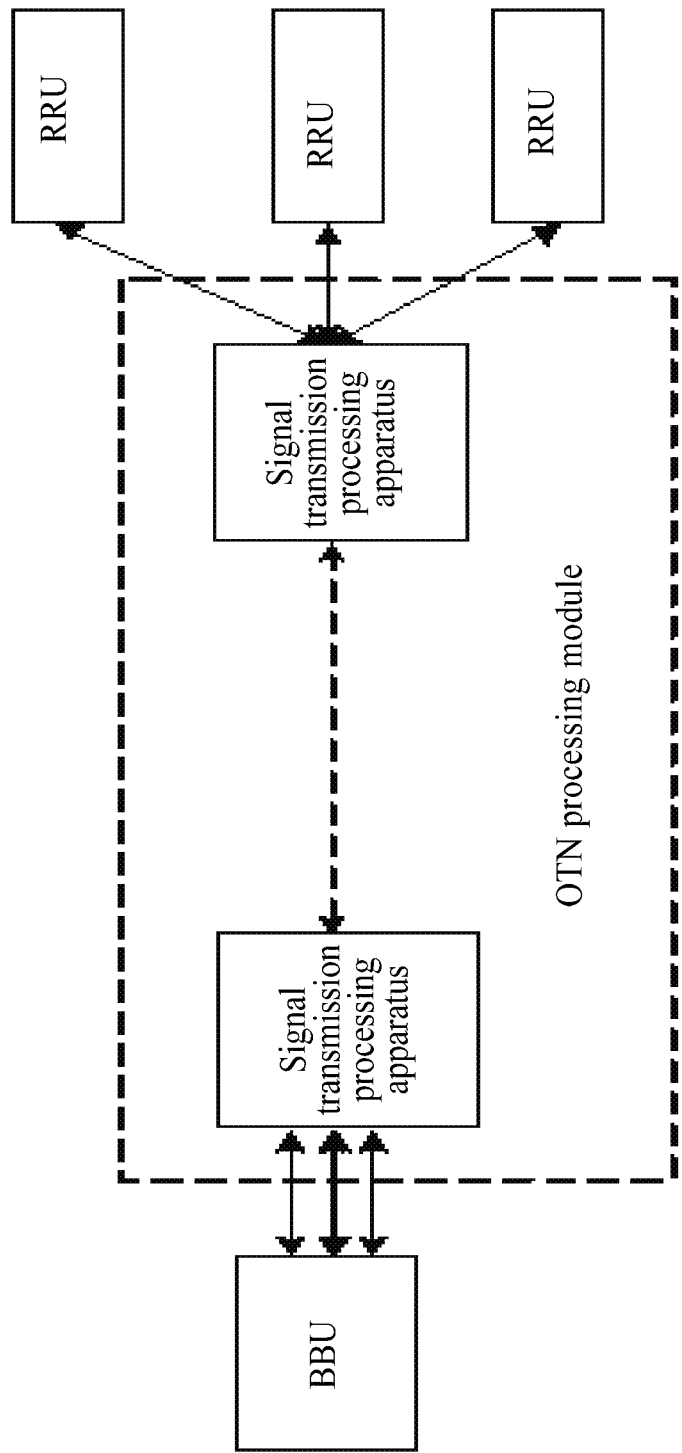
FIG. 5A is a first structure diagram of a distributed base station according to an embodiment of the present invention.
Figure 5B:
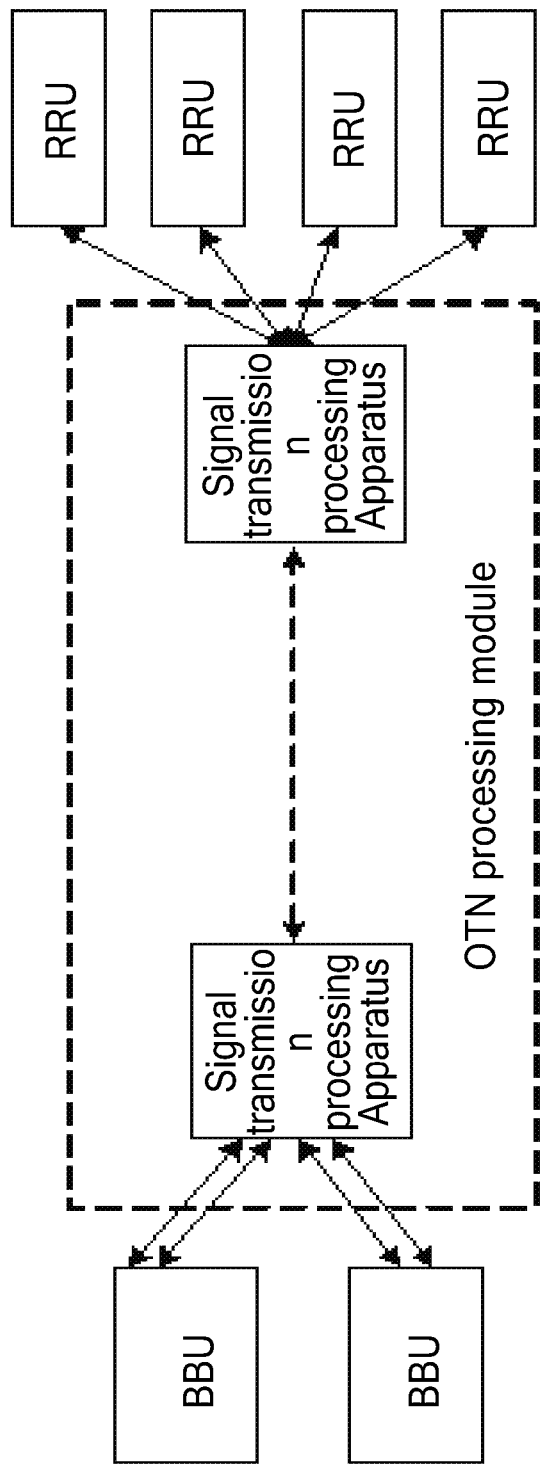
FIG. 5B is a second structure diagram of a distributed base station according to an embodiment of the present invention.

FIG. 5A is a first structure diagram of a distributed base station according to an embodiment of the present invention, and FIG. 5B is a second structure diagram of a distributed base station according to an embodiment of the present invention. The embodiment provides a distributed base station based on the OTN technology. As shown in FIG. 5, the base station includes a BBU, an RRU, and an OTN processing module. The OTN processing module includes a distributed-base-station-interface-signal transmission processing apparatus at the BBU side, and a distributed-base-station-interface-signal transmission processing apparatus at the RRU side and a transmission link, where the transmission link is an OTN or a directly-attached optical fiber. In FIG. 5A, a BBU is connected to a signal transmission processing apparatus. Multiple channels of interface signals of the distributed base station that are sent by the BBU are firstly processed by the above signal transmission processing apparatus, and then the signals processed are transmitted through an optical fiber or OTN. The distributed-base-station-interface-signal transmission processing apparatus at the RRU side performs corresponding processing for received signals, restores the interface signals of the distributed base station, and sends the interface signals to the RRU. FIG. 5B shows that two or more BBUs correspond to one distributed-base-station-interface-signal transmission processing apparatus.

The OTN technology according to the embodiments is a technology using large-capacity transmission on the internet. It is suitable to be used in bearer transmission of interface signals of the distributed base station. The feature of large-capacity transmission of the OTN is suitable of adopting different signal frames for different transmission capacities. For example, OTU1, OTU2, OTU3, or OTU4 can be adopted, where the transmission capacity (size of the bandwidth) of OTU1 is 2.488 G, the transmission capacity of OTU2 is 9.95 G, four times as large as that of OTU1, the transmission capacity of OTU3 is four times as large as that of OTU2, and the transmission capacity of OTU4 is larger. Interface signals of the distributed base station may be encapsulated into OTU1 signal frames, or OTU2 signal frames, or OTU3 signal frames, or even OTU4 signal frames of the OTN. The current commercial bandwidth of interface signals of the distributed base station ranges from 600M to 3.1 G. Typical commercial rates include: 768 Mbps, 1536 Mbps, and 3072 Mbps which are required by the OBSAI; 614.4 Mbps, 1228.8 Mbps, and 2457.6 Mbps which are required by the CPRI/IR. In future, a higher rate, such as 6 G to 10 G, may emerge. The signal frames such as OTU2 signal frames, OTU3 signal frames, and OTU4 signal frames of the OTN may be encapsulated and transmitted at any of the above transmission rates. Currently, a mainstream rate of interface signals of the distributed base station has exceeded 1228.8M, which is suitable of adopting the OTN transmission channel with large capacity.

Figure 6:
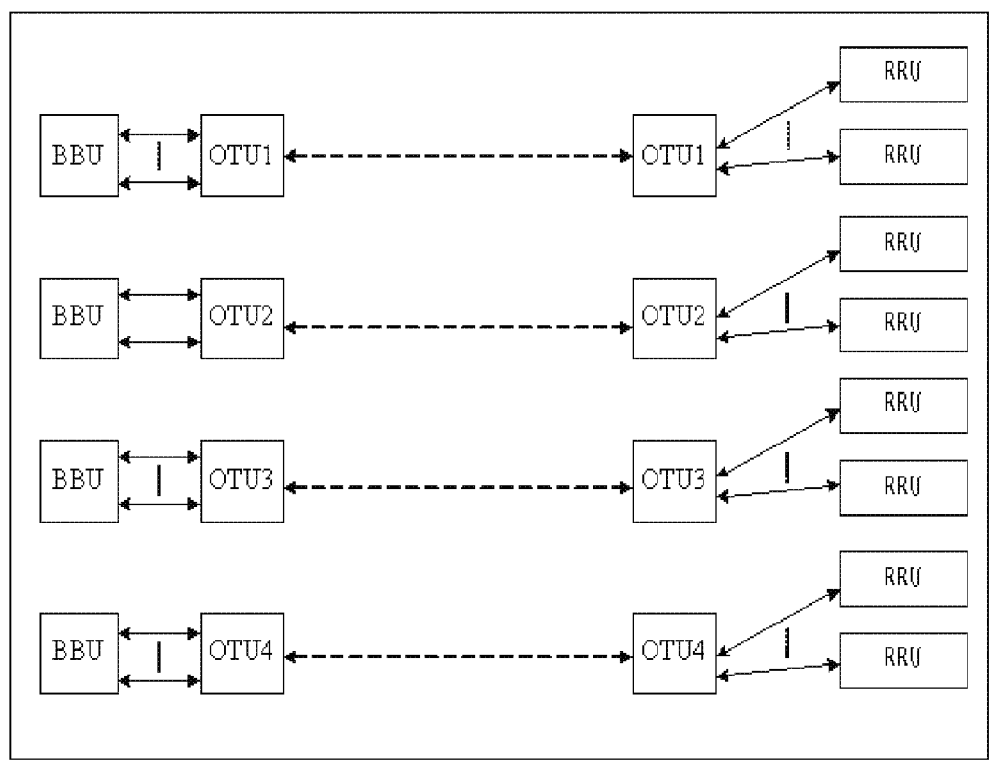
FIG. 6 is a networking structure when different optical transport units (OTUx) signal frames are adopted according to an embodiment of the present invention.

FIG. 6 is a networking structure when different OTUx signal frames are adopted according to an embodiment of the present invention. As shown in FIG. 6, in downlink signal transmission, namely, when the signals are transmitted from the BBU to the RRU, one or more BBUs include multiple channels of interfaces of the distributed base station, and electrical signals or optical signals of one or more channels of the interfaces of the distributed base station are transmitted to a signal transmission processing apparatus, namely, the OTN processing unit. The above OTN processing unit is configured to perform OTN electrical layer multiplexing for the obtained interface signals of the distributed base station. The following embodiment elaborates the details. If an optical interface is adopted, the OTN processing unit firstly performs optic-electro conversion, then the signals are encapsulated into proper OTN signal frames, and different containers are selected according to different rates of interface signals of the distributed base station. Take IR 2.4576 G for an example. One channel of IR 2.4576 G signals may be selected to be encapsulated into one channel of OTU1, which is a special example of OTN electrical layer multiplexing in the embodiment of the present invention. That is, with regard to a case of one channel of IR interface signals, four channels of IR 2.4576 G signals are encapsulated into one channel of OTU2 and 16 channels of IR 2.4576 G signals are encapsulated into one channel of OTU3 to realize multiplexing of interface signals of the distributed base station. After the OTN signal frames are transmitted to the electro-optic module for electro-optic conversion, the OTN signal frames are transmitted to the downstream through an OTN or optical fiber network. The OTN processing unit receives the signals from the upstream, performs optic-electro conversion, performs frame processing for the OTN signals, and restores each channel of interface signals of the distributed base station from OTU1, OTU2, and OTU3, etc. In the process of restoring the signals, the clock for each channel of interface signals of the distributed base station may be independently restored at the same time. That is, after being transmitted through the OTN or directly-attached optical fiber, each channel of the interface signals of the distributed base station are restored through synchronous demultiplexing or asynchronous demultiplexing, where electro-optic conversion may be performed for the restored interface signals of the distributed base station, and the signals are transmitted to the RRU through an optical interface or electrical interface.

Multiplexing and demultiplexing provided in the embodiment of the present invention may adopt a Generic Mapping Procedure (GMP) mapping scheme. As shown in FIG. 7, by using this method, the interface signals of the distributed base station are directly multiplexed to an ODUk payload area, and bit streams of the distributed base station are directly mapped to the D byte therein. Compared with the previous method of GFP-T ensuplation that the signals are encoded through 8B/10B and 64/65B encoding and are multiplexed to STMx, intermediate encoding and decoding, and GFP frame processing are simplified, and therefore the transparency is higher.

Figure 8A:
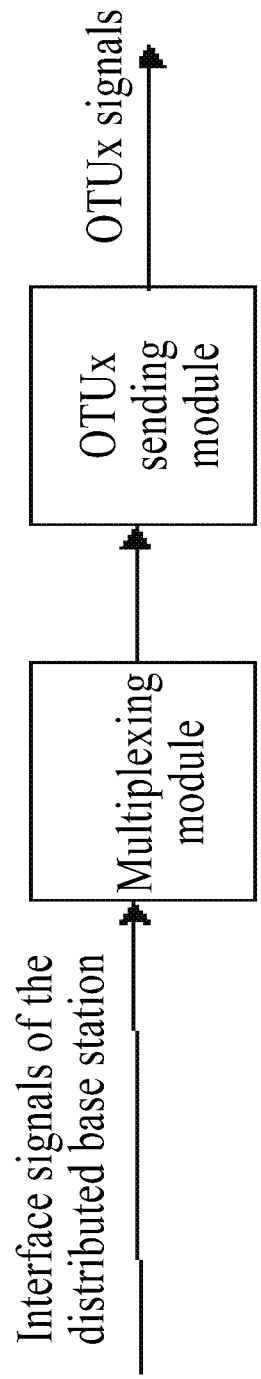
FIG. 8A is a flowchart of transmitting signals according to an embodiment of the present invention.
Figure 8B:
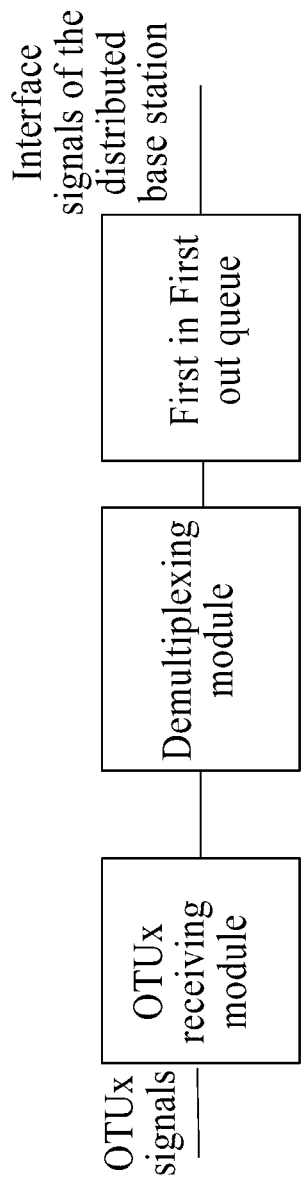
FIG. 8B is a flowchart of receiving signals according to an embodiment of the present invention.

As shown in FIG. 8A, the interface signals of the distributed base station according to the embodiment of the present invention are multiplexed by the multiplexing module to OTUx, and then the OTUx signals are sent by an OTUx sending module. As shown in FIG. 8B, at the receiving end, an OTUx receiving module receives the preceding OTUx signals, the demultiplexing module demultiplexes the OTUx signals, and then the signal clock of the distributed base station is restored according to the FIFO (first in first out) status and the interface signals of the distributed base station are restored.

In transmitting the uplink signals, namely, when the data is sent to the BBU from the RRU, the process of processing signals are basically the same to the process of the downlink signal transmission.

Figure 9:
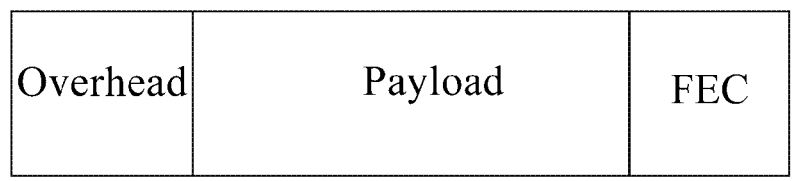
FIG. 9 is a schematic diagram of the frame structure of OTUx according to an embodiment of the present invention.

In the embodiments of the present invention, the OTUx signal frames in the OTN system may include the Forward Error Correction (FEC). By using the FEC technology, the line error can be corrected. When the error rate is 10-5, it can be reduced to 10-15 after the FEC processing. The above error rate after correction can meet the requirements on the error rate for the interface of the distributed base station. As shown in FIG. 9, the frame structure of OTUx includes an overhead area, a payload area, and an FEC area. In the specific implementation process, different interface signals of the distributed base station may be placed into different positions of the payload area. As the check redundant code, the FEC can further perform check and restoring based on the transmission error including the payload so as to enhance the network.

Besides, the overhead area in the frame structure of the OTUx can provide sufficient overhead management. In the direction of receiving the signals, BIP-8 error statistics may be performed, and LOF and OOF alarms may be monitored and reported; in the direction of sending the signals, the failure may be reported towards the downstream through the overhead based on the received failure signals, the failure may be positioned and indicated very clearly, thereby effectively improving the efficiency of operation and maintenance of the transmission network.

By using the signal transmission processing method and apparatus and the distributed base station according to the present invention, OTN electrical layer multiplexing is performed on at least one channel of interface signals of the distributed base station, electro-optic conversion is performed for the signals obtained through OTN electrical layer multiplexing to generate a channel of optical signals, and the signals are transmitted. Therefore, multiple channels of interface signals of the distributed base station can be multiplexed into one channel of optical signals, and the optical signals are transmitted between the BBU and the RRU of the distributed base station, thereby improving the efficiency of signal transmission.

It should be noted that the above embodiments are merely used to illustrate the technical solutions of the present invention, but not intended to limit the scope of the present invention. Although the present invention is described in detail with reference to exemplary embodiments, those skilled in the art should understand that: Any modification or equivalent replacement made on the technical solutions of the present invention without departing from the spirit and principle of the present invention should fall within the protection scope of the present invention.

What is claimed is:

1. A method for transmitting an interface signal through an optical transport network, comprising:
    mapping a plurality of Common Public Radio Interface (CPRI) signals of a distributed base station into an optical data unit k (ODUk) payload area of an optical transport unit k (OTUk) signal, wherein the k represents a transmission capacity of the OTUk signal, wherein the ODUk payload area is part of an ODUk, and wherein the ODUk is mapped into the OTUk;
    performing electro-optic conversion on the OTUk signal to generate an optical signal; and
    sending the optical signal.

2. The method of claim 1, wherein a Generic Mapping Procedure (GMP) mapping scheme is used during the process of mapping the plurality of CPRI signals into the ODUk payload area.

3. The method of claim 1, wherein a first CPRI signal and a second CPRI signal having different rates are mapped into a first ODUk and a second ODUk corresponding to different OTUk signals having different transmission capacities, respectively.

4. The method of claim 1, wherein a container of the OTUk signal is selected according to a rate of the plurality of CPRI signals.

5. An apparatus for transmitting an interface signal of a distributed base station, comprising:
    a processor and a non-transitory computer readable medium having a plurality of computer executable instructions stored thereon which, when executed by the processor, cause the processor to map a plurality of Common Public Radio Interface (CPRI) signals of the distributed base station into an optical data unit k (ODUk) payload area of an optical transport unit k (OTUk) signal, and perform electro-optic conversion on the OTUk signal to generate an optical signal, wherein the k represents a transmission capacity of the OTUk signal, wherein the ODUk payload area is part of an ODUk, and wherein the ODUk is mapped into the OTUk; and
    a transmitter configured to send the optical signal.

6. The apparatus of claim 5, wherein a Generic Mapping Procedure (GMP) mapping scheme is used when the processor maps the plurality of CPRI signals into the ODUk payload area.

7. The apparatus of claim 5, wherein a first CPRI signal and a second CPRI signal having different rates are mapped into a first ODUk and a second ODUk corresponding to different OTUk signals having different transmission capacities, respectively.

8. A method for receiving an interface signal of a distributed base station through an optical transport network, the method comprising:
    receiving an optical signal;
    performing optic-electro conversion on the optical signal to generate an optical transport unit k (OTUk) signal, wherein the OTUk signal is derived from a mapping of an optical data unit k (ODUk), the ODUk including an ODUk payload area, wherein the ODUk payload area is derived from a mapping of a plurality of Common Public Radio Interface (CPRI) signals of the distributed base station, and wherein the k represents a transmission capacity of the OTUk signal; and
    de-mapping the OTUk signal to obtain the plurality of CPRI signals.

9. The method of claim 8, wherein a Generic Mapping Procedure (GMP) mapping scheme is used during the process of mapping the plurality of CPRI signals into the ODUk payload area, as such an inverse GMP mapping scheme is applied in the de-mapping.

10. The method of claim 8, wherein a first CPRI signal and a second CPRI signal having different rates are mapped into a first ODUk and a second ODUk corresponding to different OTUk signals having different transmission capacities, respectively.

11. An apparatus for receiving an interface signal of a distributed base station through an optical transport network, the apparatus comprising:
    a receiver configured to receive an optical signal, perform optic-electro conversion on the optical signal to generate an optical transport unit k (OTUk) signal, wherein the OTUk signal is derived from a mapping of an optical data unit k (ODUk), the ODUk including an ODUk payload area, wherein the ODUk payload area is derived from a mapping of a plurality of Common Public Radio Interface (CPRI) signals of the distributed base station, and wherein the k represents a transmission capacity of the OTUk signal; and
    a processor and a non-transitory computer readable medium having a plurality of computer executable instructions stored thereon which, when executed by the processor, cause the processor to demap the OTUk signal to obtain the plurality of CPRI signals.

12. The apparatus of claim 11, wherein a Generic Mapping Procedure (GMP) mapping scheme is used during the process of mapping the plurality of CPRI signals into the ODUk payload area, as such an inverse GMP mapping scheme is applied in the de-mapping.

13. The apparatus of claim 11, wherein a first CPRI signal and a second CPRI signal having different rates are mapped into a first ODUk and a second ODUk corresponding to different OTUk signals having different transmission capacities, respectively.

* * * * *